Nov. 6, 1928. 1,690,763

L. WERTHEIMER

COFFEE LEACHER

Filed Aug. 2, 1927

INVENTOR
Leo. Wertheimer
By
ATTORNEY

Patented Nov. 6, 1928.

1,690,763

UNITED STATES PATENT OFFICE.

LEO WERTHEIMER, OF BUFFALO, NEW YORK.

COFFEE LEACHER.

Application filed August 2, 1927. Serial No. 210,064.

The principal object of my invention has been to provide a coffee leacher of glass, so constructed that maximum extraction of the coffee occurs before the same passes into the coffee urn.

Another object has been to provide a leacher which will form a support for the coffee bag, while at the same time permitting free passage of the coffee to the urn.

Furthermore, my device is provided with a glass button arranged over the outlet opening, whereby the flow of coffee to the urn shall be retarded and the coffee bag prevented from closing up the opening.

Moreover, my device is provided with convenient means for attaching and detaching the coffee sack to the device.

The above objects and advantages have been accomplished by the device shown in the accompanying drawings, of which:

Figure 1:
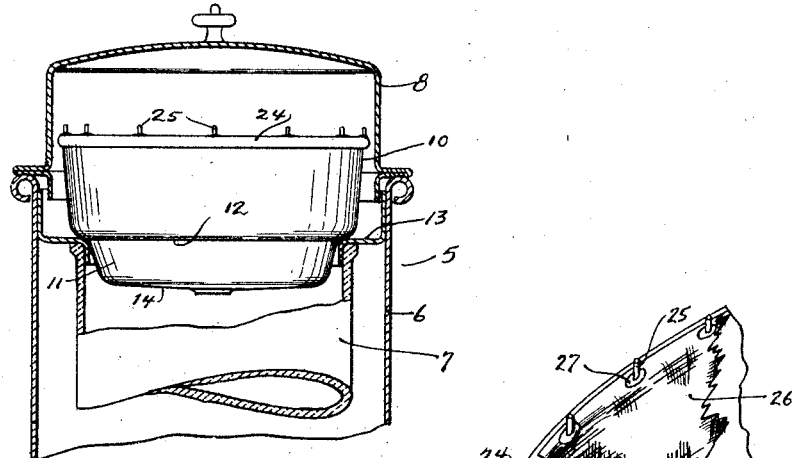
Fig. 1 shows a side elevation of the device in position within a coffee urn.

Referring to the drawings, 5 represents a coffee urn having an outer casing 6. The coffee container is represented at 7. 8 is the cover of the urn.

My leacher is made in the form of an open-mouthed receptacle having a side wall 10 and a reduced peripheral portion 11 at its lower side, whereby a shoulder 12 is provided. As shown in Fig. 1, this shoulder is utilized to support the device on the top of the coffee container or the flange 13 arranged at the top of the container. The leacher is also provided with a bottom 14 which preferably slopes from the side wall of the reduced peripheral portion 11 toward the center of the leacher where it is provided with an opening 15. On the upper surface of the bottom 14 is provided a plurality of upstanding ridges 16. The ridges are interspaced so as to provide annular spaces 17 between them. The ridges vary in length increasing from the center of the receptacle outwardly toward the wall of the portion 11, whereby radially extending grooves or troughs 18 are formed. The ridges 19 arranged at the center of the device and adjacent the opening 15 preferably overlap a number of the radial grooves or troughs 18 whereby the flow of coffee down these troughs is somewhat retarded. A glass button 20 having a flange 21 and a downwardly extending portion 22 is arranged over the central opening 15 and is supported by means of the flange 21 over the openings by contact with the ridges 19. This button serves to somewhat restrict the opening 15 and thus retard the flow of the coffee from the leacher whereby maximum extraction of the coffee may be had before it passes from the leacher into the urn.

Figures 2, 4:
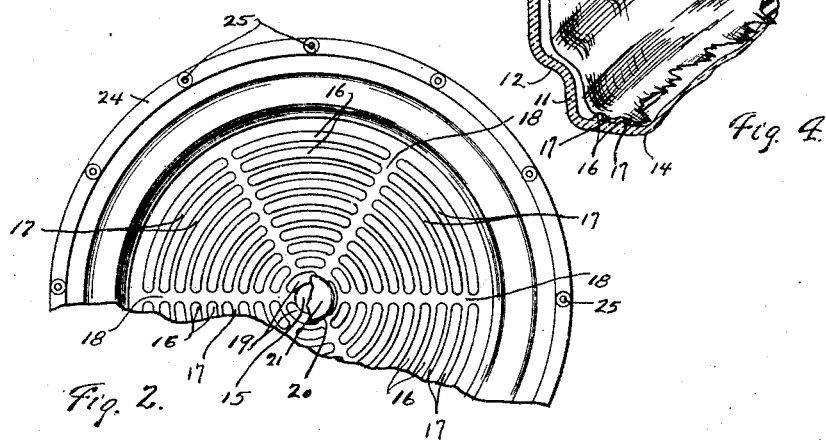
Fig. 2 is an enlarged, fragmentary plan view of the same.
Fig. 4 is a fragmentary, perspective view showing the coffee bag in position in the leacher.
Figure 3:
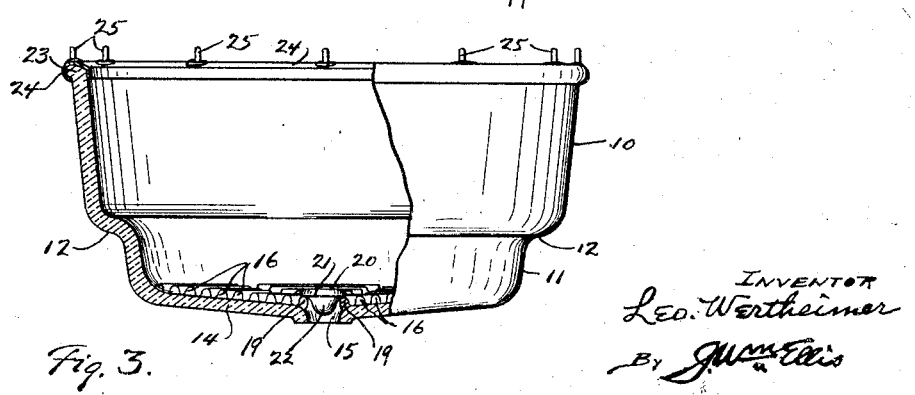
Fig. 3 is an enlarged, side elevation of my device with a portion thereof broken away.

About the upper beaded edge 23 of the leacher is preferably provided a metallic ring 24. This ring may be spun onto the bead 23 or otherwise secured in place thereto. The ring is provided with a plurality of fastening means 25, which may be in the form of the pins shown, or if desired, any form, such as, for instance, turn buttons, snap fasteners, or the like. These fastening means provide supports for the leacher bag 26 as shown in Fig. 4. The bag is preferably provided with rings 27 which engage with the pins 25 or with any other fastening means which it is desired to employ.

It will be seen that the leacher bag does not come into direct contact with the upper surface of the bottom 14 of the leacher, but is held in interspaced relation therewith by means of the ridges 16. The button 20 serves to keep the bag from clogging the opening 15. Obviously, the extracted coffee coming through the leacher bag will flow through the passageways 17 and 18 and finally through the opening 15 to the coffee container below the leacher.

While I have shown passageways 17 and 18 formed between the ridges 16 to keep the coffee bag spaced away from the bottom 14 to permit the flow of the coffee toward the opening 15, it is obvious that grooves may be formed in a smooth bottom and the same results accomplished. Moreover, the receptacle may be made rectangular, if desired.

These and other modifications of the details herein shown and described may be made without departing from the spirit of my invention, or the scope of the appended claims, and I do not, therefore, wish to be limited to the exact embodiment herein shown and described, the form shown being merely a preferred embodiment thereof.

Having thus described my invention, what I claim is:

1. A coffee leacher comprising a receptacle having a side wall and a bottom, the bottom being formed with an opening and spaced ridges providing a plurality of passageways for the flow of the coffee to the opening, and a button having a flange supported on the ridges adjacent the opening and having a tapered portion extending downwardly into said opening.

2. A coffee leacher comprising a bowl-shaped receptacle having a side wall and a bottom, the bottom having a central opening and formed with a plurality of radial passageways leading to the central opening, and a plurality of annular passageways connecting said radial passageways.

3. A coffee leacher comprising a receptacle having a side wall and a bottom, the bottom formed with a central opening, and a plurality of spaced arcuate ribs concentrically disposed on said bottom to provide a plurality of intersecting annular and radial passageways for the flow of coffee to the central opening.

4. A coffee leacher comprising a receptacle having a side wall and a bottom, the bottom being formed with a central opening and a plurality of concentric annular ribs interrupted to form a plurality of radial passageways intersecting the annular passageways between the ribs, and spaced ribs adjacent the central opening disposed in staggered relation to the radial passageways.

5. A coffee leacher comprising a receptacle having a side wall and a bottom, the bottom having a central opening and formed with spaced annular ribs interrupted to form radial passageways intersecting the annular passageways between the ribs, and a central rib surrounding the central opening and having passages therethrough staggered relative to said radial passageways, a button supported on said central rib and extending loosely into said central opening, and a coffee bag supported within the receptacle.

In testimony whereof, I have hereunto signed my name.

LEO WERTHEIMER.